J. W. THOMPSON.

Assignor to himself and BUCKEYE ENGINE Co.

Valve-Gear for Steam-Engine.

No. 8,433. Reissued Sept. 24, 1878.

Witnesses
Geo. A. Vaillant.
Wm. E. Morgan.

Inventor
Jas. W. Thompson
by J. Thomson Bell
atty.

THE NORRIS PETERS CO., PHOTO-LITHO., WASHINGTON, D. C.

UNITED STATES PATENT OFFICE.

JOSEPH W. THOMPSON, OF SALEM, OHIO, ASSIGNOR TO HIMSELF AND BUCKEYE ENGINE COMPANY.

IMPROVEMENT IN VALVE-GEARS FOR STEAM-ENGINES.

Specification forming part of Letters Patent No. 162,715, dated April 27, 1875; Reissue No. 8,433, dated September 24, 1878; application filed September 14, 1878.

DIVISION B.

*To all whom it may concern:*

Be it known that I, JOSEPH W. THOMPSON, of Salem, in the county of Columbiana and State of Ohio, have invented certain new and useful Improvements in Steam-Engine Governors, of which the following is a specification:

The object of my invention, which relates to governors of the class secured upon and rotating with the main shaft of the engine, and hence partaking of the same angular velocity, is to provide, in a governor of simple construction and adaptability to the operation of regulating the movements of a cut-off valve, means for approximating perfect isochronal regulation as far as may be practicable under existing conditions as to load, pressure, and speed, and of readily adjusting the degree of isochronism in consonance with changes of such conditions, when desired.

To these ends my improvements consist in the combination of a supporting case or disk adapted to be secured upon the driving-shaft of the engine, arms pivoted to said case at one end and carrying a weight or ball at the other, and springs acting in reverse direction to the centrifugal force of the weights, and connected to the pivoted weight-arms between the weights and the pivots of the arms.

My improvements further consist in the combination, with the pivoted weight-arms and their centripetally-acting springs, of a device for varying and adjusting the tension of the springs, all as hereinafter more fully set forth.

Figure 1:
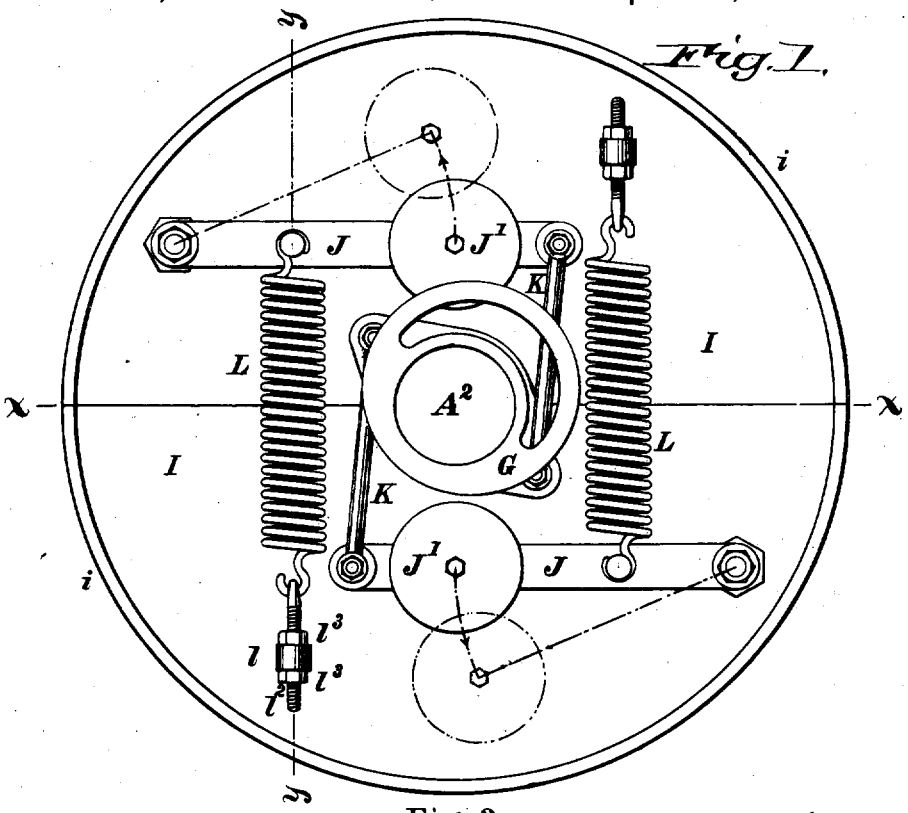
Figure 3:
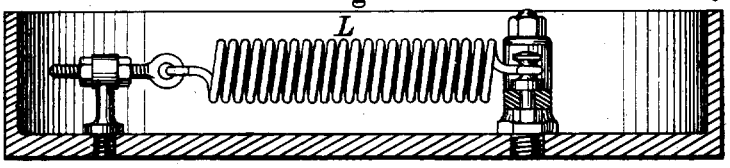
Figure 2:
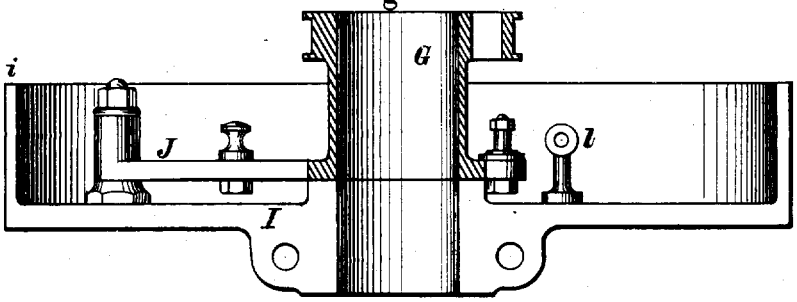

In the accompanying drawings, Figure 1 is a front or face view of a governor embodying my improvements; Fig. 2, a transverse central section through the same at the line *x x* of Fig. 1, and Fig. 3 a transverse section at the line *y y* of Fig. 1.

The operative mechanism of the governor is attached to and supported in a case or disk, I, which is provided with a rim or flange, *i*, on its periphery, and is firmly secured upon the main or driving shaft $A^2$ of the engine. Two weight-arms, J, are each pivoted at one end to the case I at points diametrically opposite each other and adjacent to the outer rim, their free ends being connected by links K K to an eccentric, G, which is fitted easily upon the shaft $A^2$, and is movable angularly about the center thereof, in consonance with the vibrations of the weight-arms J about their points of attachment to the case, such vibrations being induced outwardly by the centrifugal force of weights J′, secured upon the arms J at or near the ends, to which the links K are connected, and inwardly by the centripetal action of springs L L, each of which is connected at one end to one of the arms J, between its weight and the pivot on which it vibrates, and at the other, through the intermediation of a device for adjusting its tension, to a pin, *l*, on the case I. Said device consists, in this instance, of an adjusting-screw, $l^2$, one end of which is connected to the spring L, and which is provided with nuts $l^3$, one on each side of the pin *l*, through which the screw passes. By the proper adjustment of the nuts $l^3$ the tension of the spring may be varied in conformity with the nature and extent of the variations of resistance of load under which the engine operates.

In the operation of the governor, the cut-off eccentric G is advanced upon the shaft to intercept the flow of steam into the cylinder-ports by the outward movement of the weight-arms J, induced by the centrifugal force of the weights J′, resultant upon an increase of pressure or decrease of resistance of load, and is correspondingly retracted under reverse conditions to increase the supply of steam through the ports by the inward movement of the weight-arms due to the centripetal action of the springs L. The attachment of the springs L to the weight-arms between their pivots and weights admits of the use of a spring having such range of tension or limits of permanent elasticity as will enable its initial and final effort to be each exerted proportionately to and in correspondence with the centrifugal force of the weights at the inner and outer extremities of the traverse of their respective arms; or, in other words, that the resistance of the springs shall increase in proper proportion to the increase of centrifugal force of the weights in their outward movement, such combined centrifugal and centripetal influence being as nearly within the requirements of perfect isochronal governing action as is consistent with stable regulation. The addition of the adjusting device places the sensitiveness of the governor so completely under the control of the engineer that he may, by properly varying the tension of the springs, adapt the governor to widely-varying characters of resistance, as are met with in saw-mills, rolling-mills, and analogous service, the higher tensions giving the smallest percentage of variation of speed.

I am aware that a governor secured upon and rotating with the driving-shaft of an engine is not new, and do not therefore broadly claim such device.

I claim as my invention and desire to secure by Letters Patent—

1. The combination, in a steam-engine governor, of a supporting-case, arms pivoted thereto and carrying weights upon their outer ends, and springs whose tension acts in reverse direction to the centrifugal force of the weights throughout the traverse of their arms, said springs being connected to the weight-arms between their pivots and weights, substantially as set forth.

2. The combination, in a steam-engine governor, of a supporting-case, weight-arms pivoted to said case, and centripetally-acting springs, each of which has its ends connected respectively to one of the weight-arms between its pivot and weight and to a device connected to the case by which the tension of the spring can be varied and adjusted, all constructed and arranged substantially as set forth.

JOSEPH W. THOMPSON.

Witnesses:

THOMAS KENNETT,

PETER AMBLER.